United States Patent [19]

Ebbinghaus et al.

[11] Patent Number: 4,583,622
[45] Date of Patent: Apr. 22, 1986

[54] ADJUSTING DEVICE FOR VEHICLE BRAKES

[75] Inventors: Wilfried Ebbinghaus; Erwin Henze; Wilhelm Gross, all of Wiehl, Fed. Rep. of Germany

[73] Assignee: Bergische Achsenfabrik Fr. Kotz & Sohne, Wiehl, Fed. Rep. of Germany

[21] Appl. No.: 670,299

[22] Filed: Nov. 13, 1984

[30] Foreign Application Priority Data

Mar. 15, 1984 [DE] Fed. Rep. of Germany ....... 3409454

[51] Int. Cl.⁴ .............................................. F16D 65/52
[52] U.S. Cl. ................................. 188/79.5 K; 74/128; 188/196 BA; 188/196 M
[58] Field of Search ................. 188/79.5 K, 79.5 GT, 188/79.5 GE, 79.5 GC, 79.5 R, 196 BA, 196 V, 79.5 P, 196 C, 196 P, 196 M, 196 D; 74/128, 458, 425; 192/108, 46, 111 A, 70.25

[56] References Cited

U.S. PATENT DOCUMENTS 3,342,293  9/1967  Hildebrand et al. ......... 188/196 BA
3,361,230  1/1968  Hildebrand et al. .......... 188/79.5 K

FOREIGN PATENT DOCUMENTS 2120809  11/1972  Fed. Rep. of Germany .

Primary Examiner—Douglas C. Butler
Attorney, Agent, or Firm—Yount & Tarolli

[57] ABSTRACT

An automatic adjusting device for motor vehicle brakes includes a brake lever comprising a housing portion in which an adjusting gear comprising a worm and a worm wheel is located. The housing portion is connected through a clutch having frontal teeth and a drive member, with a lever having one end portion projecting into the housing portion and connected with a stationary part of the vehicle. The end portion of the lever projecting into the housing is provided with a stop that engages a recess provided in the housing portion. The cooperation between the recess and the stop limits the stroke of the brake lever.

2 Claims, 13 Drawing Figures

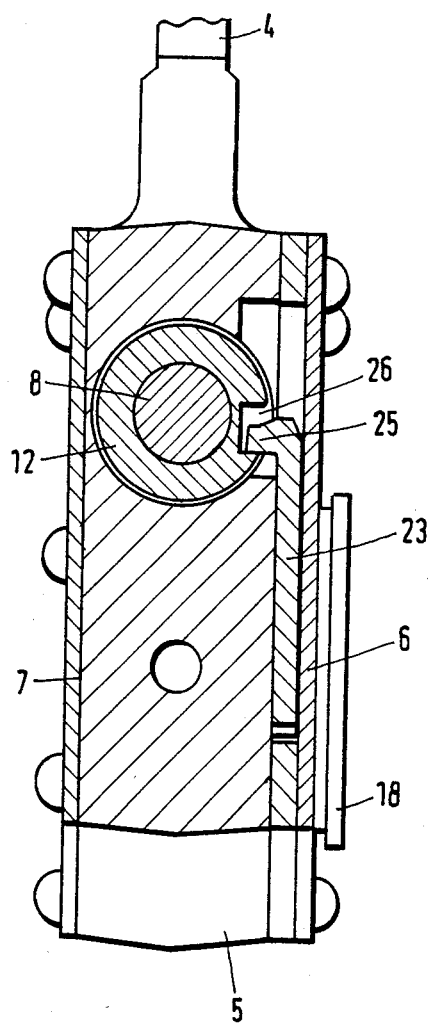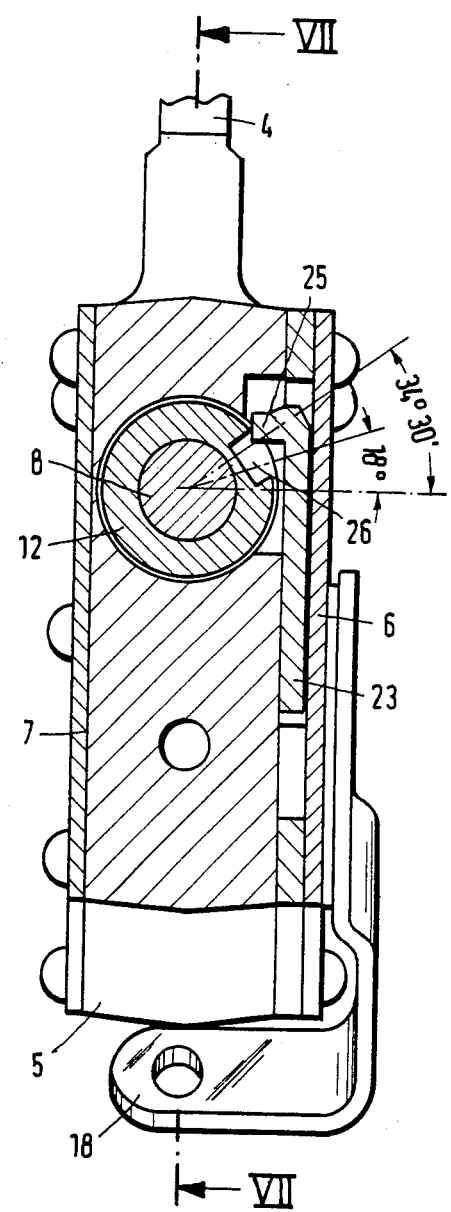

ADJUSTING DEVICE FOR VEHICLE BRAKES

The invention relates to an adjusting device for vehicle brakes and especially motor vehicle brakes. The device comprises a brake lever including a housing portion in which an adjusting gear consisting of a worm and a worm wheel is located. The housing portion, by means of a tooth clutch and a drive member, cooperates with a lever projecting into the housing portion and connected with a stationary part of a vehicle.

An adjusting device of this kind is known from German Laid-Open Application No. 2,120,809. In this known adjusting device, the maximum stroke of the brake lever is limited by the maximum stroke of the drive member arranged between the clutch and the lever. The lever with its connection part must have an appropriate thickness, since otherwise it might break. Another disadvantage of this known adjusting device is that the frontal teeth of the clutch arranged on the worm shaft can also be adjusted by more than one tooth pitch when a large brake stroke, large elasticity and heat expansion act together. In this way, the clearance necessary for an orderly operation of the brake may be eliminated. Finally, in this known adjusting device, the clutch with frontal teeth consists of two separate construction parts.

Accordingly, the invention solves the problem by providing a simple adjusting device the maximum stroke of which is limited by a stop arranged between the housing portion and the lever having an end projecting into the housing portion and connected to a stationary part of a vehicle. The stop prevents break of the drive member and its mate in case of overstroke.

To solve the problem, it is proposed that the stop is arranged on the lever end projecting into the housing, and the housing portion itself is provided with a recess cooperating with said stop to limit thereby the maximum stroke of the brake lever.

In one preferred embodiment, the stop may be formed by a ring at the inner wall of the housing portion and connected with the lever by means of a sleeve.

The adjusting device, designed according to the invention, has the advantage that clutch elements which join the adjusting gear with the stationary lever are not bound by stroke limitations, and, therefore, cannot only be dimensioned respectively smaller, but also function more precisely. In particular, the drive member between the clutch and the stationary lever would not bend any more. This makes a considerable contribution to the road traffic safety.

Other details and advantages of the invention will appear from the description which follows with reference to respective drawings wherein one preferred embodiment of the adjusting device designed according to the invention is shown. In the drawings:

FIG. 5 shows a section along line V—V in FIG. 2 of the same adjusting device, wherein a drive member is in initial position;

FIG. 6 shows a section along line VI—VI in FIG. 3 of the same adjusting device, with the drive member in the end position;

Figure 1:
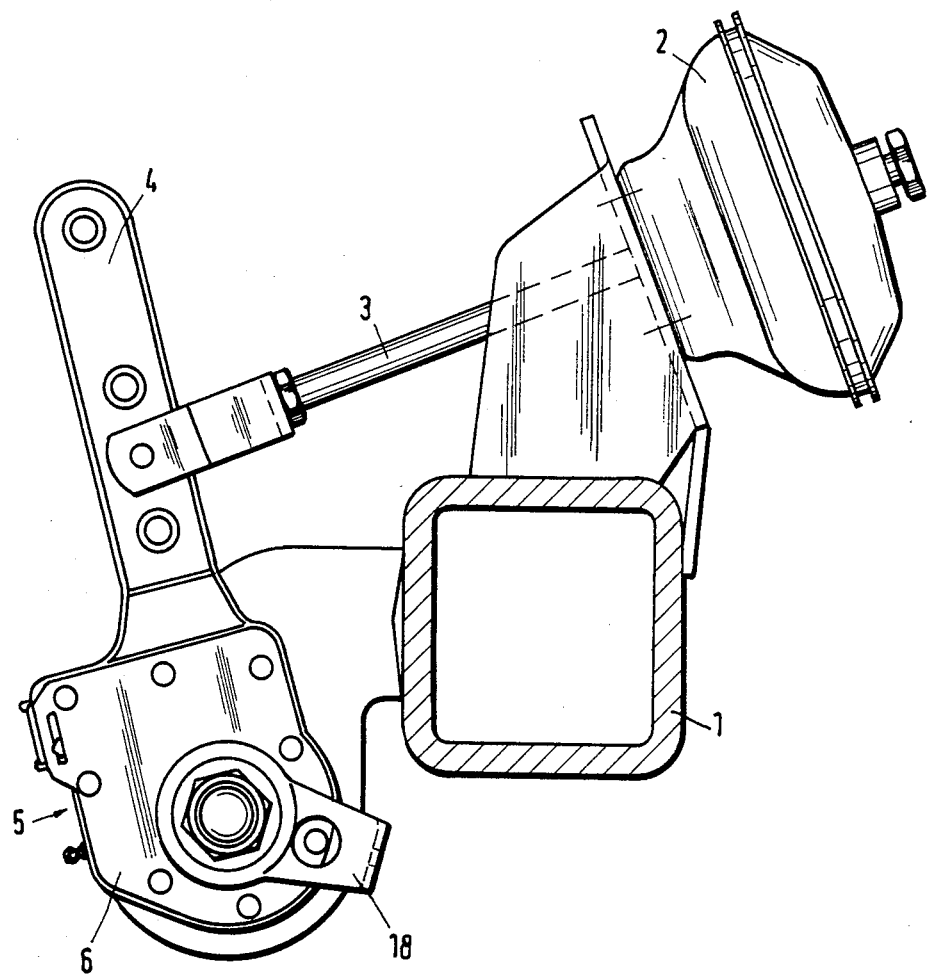
FIG. 1 shows a lateral view of a brake linkage with an adjusting device.
Figure 2:
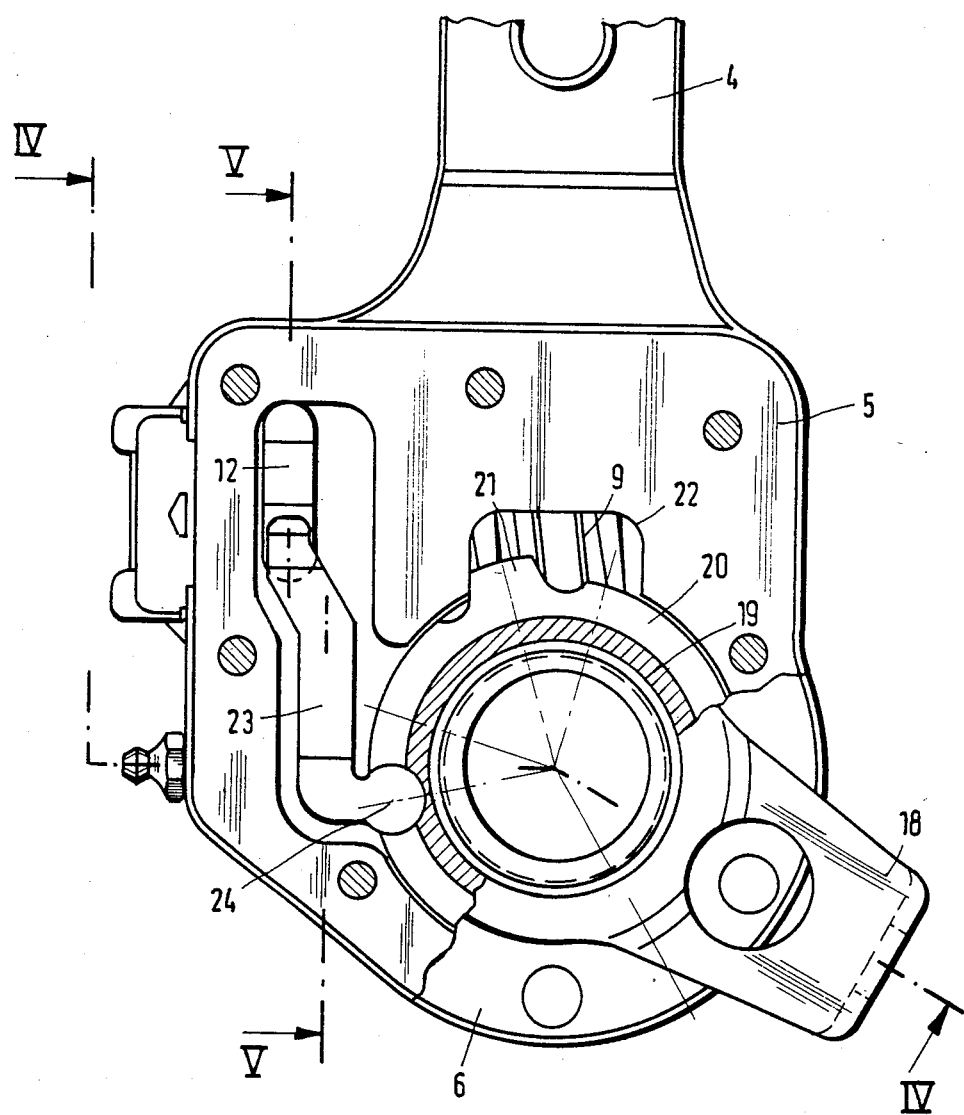
FIG. 2 is a lateral view of an adjusting device with cover partly removed to show a stroke limitation in an initial position.
Figure 3:
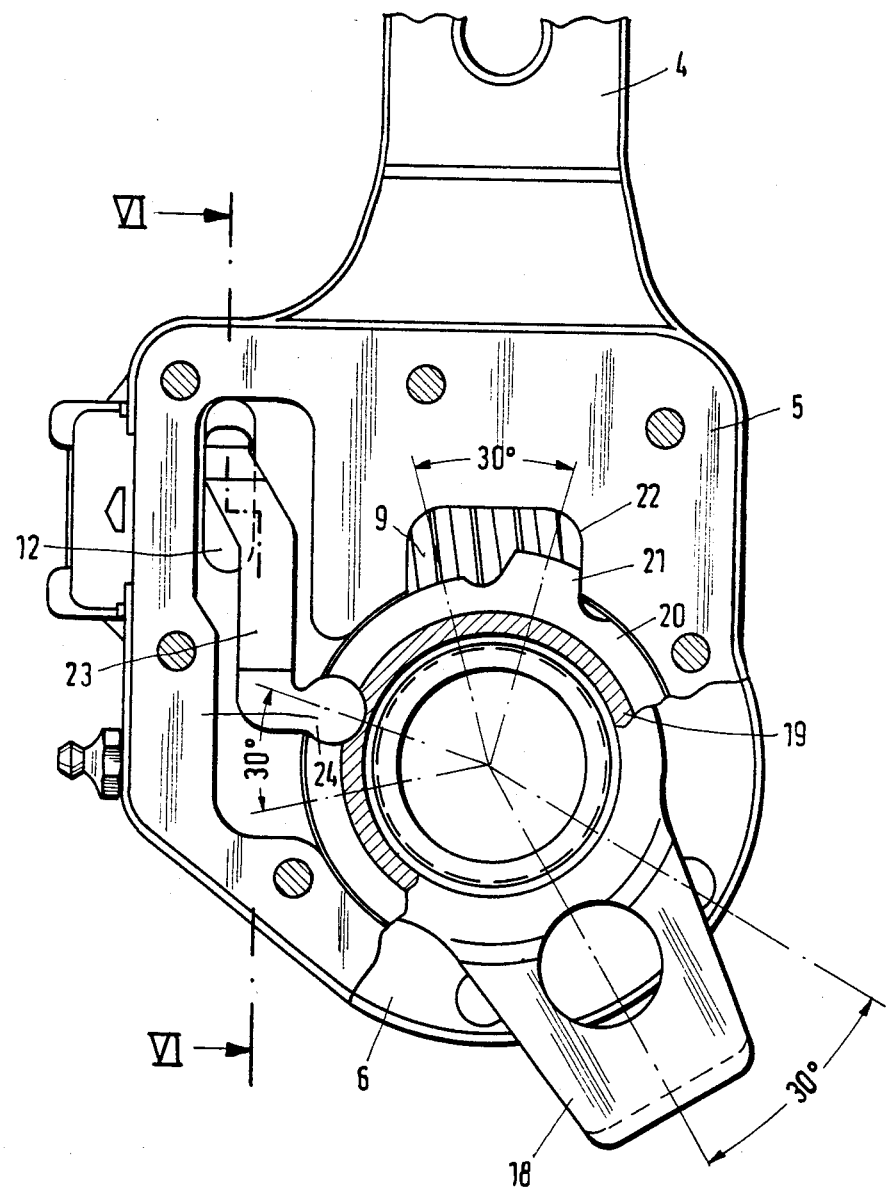
FIG. 3 shows a lateral view of the same adjusting device, showing the stroke limitation in the end position.
Figure 4:
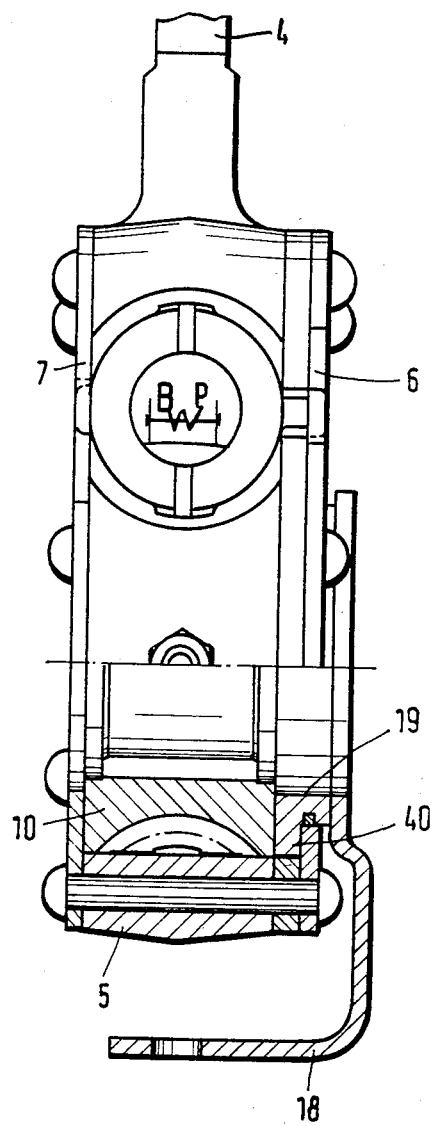
FIG. 4 shows an end view section of the same adjusting device, sectioned along line IV—IV in FIG. 2.

A brake linkage comprises a diaphragm cylinder 2, fastened to the axle body 1 and including a piston rod 3, which engages a brake lever 4, arranged on a brake shaft (not shown). By movement of the piston rod 3, the brake cam can be rotated in a drum brake so that the brake shoes or their brake linings are brought into abutment with the brake drum.

The brake lever 4 includes a housing portion 5, with an outer cover 6 and an inner cover 7. An adjusting device for compensation of wear of the brake lining is located within the housing portion. The adjusting device comprises a worm 9, arranged on a worm shaft 8, and a worm wheel 10, fastened by its inner teeth to the brake shaft (not shown).

Figure 7:
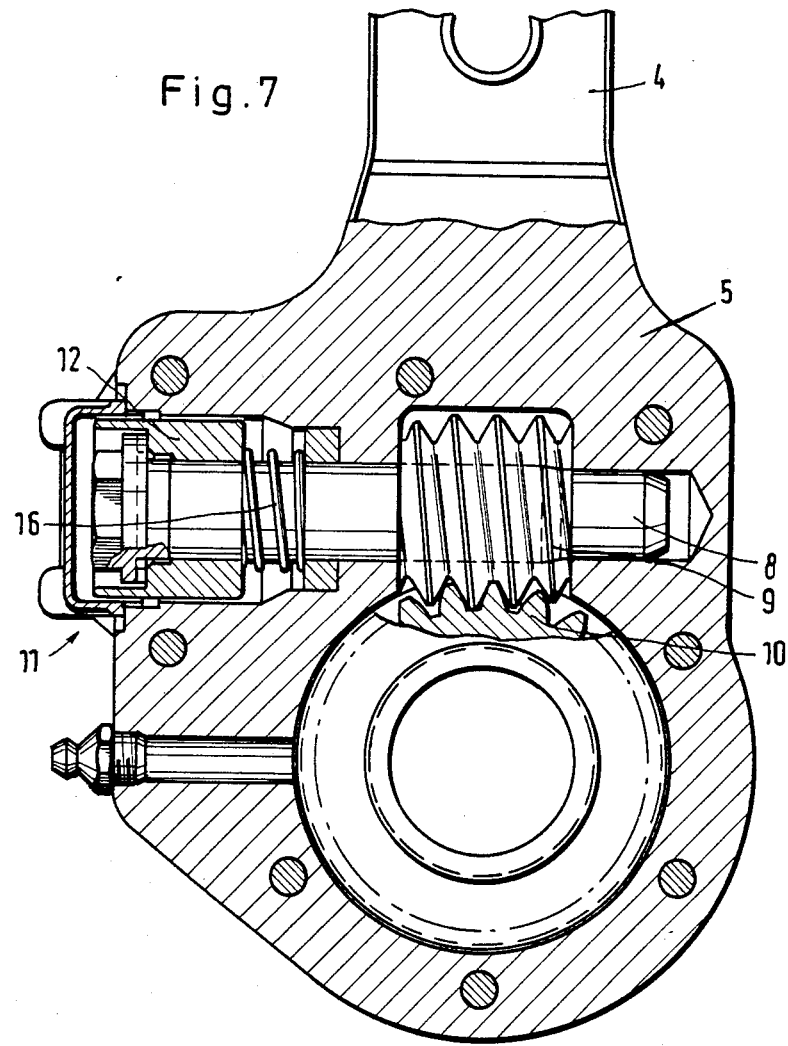
FIG. 7 shows a section along line VII—VII in FIG. 6 of a worm shaft head and a clutch ring supported thereon in engagement with each other.
Figure 8:
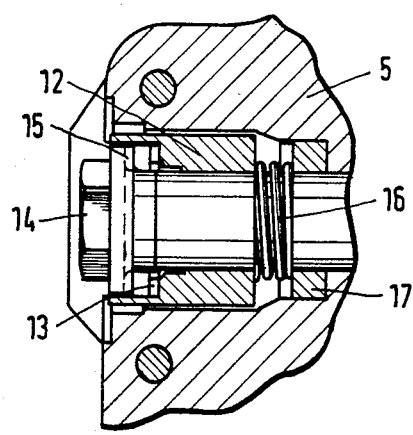
FIG. 8 is a section from FIG. 7 with two sets of teeth of the clutch in disengaged position.
Figures 9, 10:
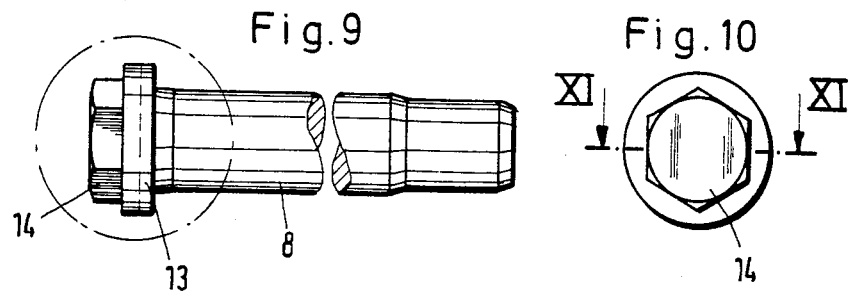
FIG. 9 is a lateral view of the worm shaft.
FIG. 10 is the end view of the same worm shaft.
Figure 11:
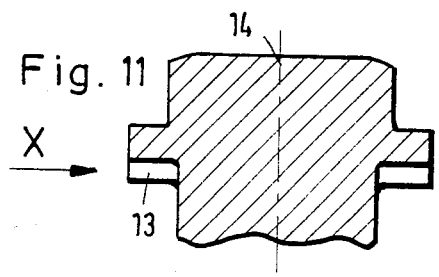
FIG. 11 shows a section along line XI—XI in FIG. 10 of the head of worm shaft on a larger scale.

On one side of the housing portion 5, a clutch 11 (FIGS. 7 and 8) is located. The clutch comprises a clutch ring 12, with frontal teeth 13 thereon. The clutch ring is supported on the worm shaft 8. The worm shaft 8 includes a head 14 designed as a hexahedron with frontal teeth 15 formed on the bottom side thereof. The two sets of frontal teeth 13, 15 are held in engagement by a compression spring 16 mounted on the worm shaft 8. A brake disc 17 is mounted on the shaft 8 on the side of spring 16 which is opposite from the clutch ring 12. This prevents unintentional rotation of the worm shaft 8.

The clutch ring 12 can be pushed against the action of the compression spring back into the housing portion 5 so that the frontal teeth 13 disengage from teeth 15, and the brake lever 4 can then be adjusted in relation to the brake shaft (not shown) with a wrench engaging the head 14 of the worm shaft.

A lever 18 is mounted on the brake shaft (not shown). The lever 18 is provided with a sleeve 19 located under the outer cover 6 and within the housing portion 5. The sleeve 19 is provided at an end thereof with a ring 20 having a stop 21 which engages a recess 22 in the housing portion 5. The stop 21 and the recess 22 limit the maximum stroke of the brake lever 4 in relation to the lever 18 which is connected with a stationary part of the vehicle, for example, the axle body 1.

A flat drive member 23 extends between the sleeve 19 of the lever 18 and the clutch ring 12. The drive member 23 engages, on the one hand, a round head 24 of the sleeve 19, and on the other hand, is provided with a hook 25 engaging a recess 26 in the clutch ring 12.

Upon actuation of the brake linkage, the brake lever 4 is rotated relative to the stationary lever 18, as can be seen in FIGS. 2 and 3 or 5 and 6, respectively. The maximum swinging movement is limited by the extent of the recess 22 in the housing portion 5 and the size of the stop 21 engaging the recess. In the example shown, this maximum swinging movement amounts to 30 degrees. Upon the swinging movement, the clutch ring 12 and the drive member 23 are rotated relative to the worm shaft 8. As long as the brake stroke does not exceed the pitch of the frontal teeth 13, 15 of the clutch 11, no adjusting takes place. But as soon as the brake stroke, as a result of wear on the brake lining, exceeds the pitch of the frontal teeth 13 and 15, the teeth engage each other, so that upon the return stroke, an adjustment takes place.

Figure 12:
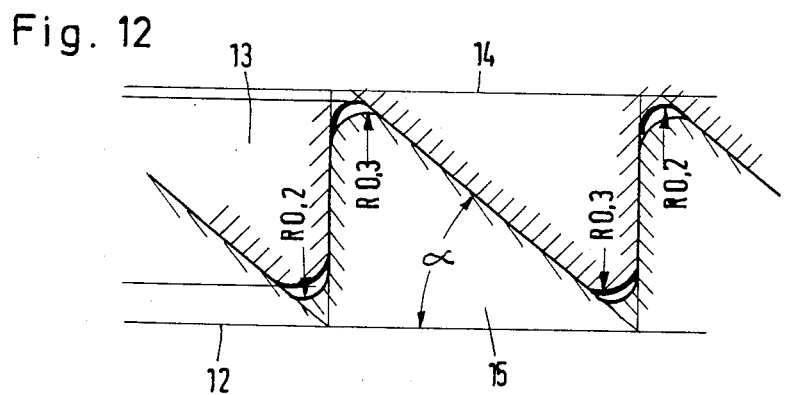
FIG. 12 is the developed view of the frontal teeth in the direction of arrow X in FIG. 11 with respect to the inner diameter.
Figure 13:
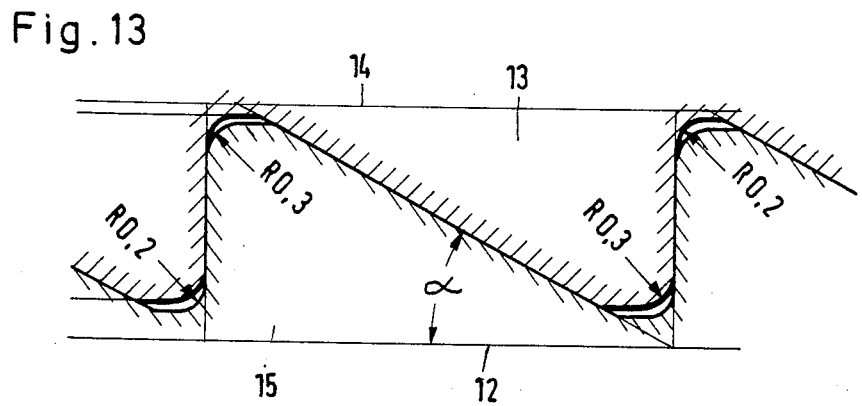
FIG. 13 is the same developed view of the frontal teeth as in FIG. 12 with respect to the outer diameter thereof.

A portion of the worm shaft 8 projecting from the worm shaft head 14 on which the frontal teeth 15 are formed is made of ordinary steel. The clutch ring 12 rotatably mounted on the worm shaft 8 is made of sintered metal. The teeth of the frontal teeth 13 on the clutch ring 12 are always in a full contact with the teeth 15 of the worm shaft 8. The teeth of the two sets are designed in a helical form, as shown in the developed views of FIGS. 12 and 13 with respect to the inner and outer diameter thereof.

The tooth pitch of the two sets of teeth 13, 15, and the dimensions of the recess 26 of the clutch ring 12 and of the hook 25 of the drive member 23 must be attuned to each other, so that in one stroke, an adjustment by a maximum of one tooth length takes place, and a clearance necessary for the operation of the brake is maintained. To this end, the hook 25 is beveled on its outside, and the recess 26 is larger than the hook 25, so that the front end of the hook 25 can move out of the recess 26 in a tangential direction and the clutch ring is no longer displaced. After the hook 25 has moved out of the recess 26, the clutch ring is held fixed in its position by the end of the hook 25, so that the hook 25, on the return stroke can always enter again the recess 26. The maximum angular amount by which the clutch ring 12 can be displaced, is slightly greater than the tooth pitch of the two sets of frontal teeth 13, 15. In this way, an adjustment by several tooth pitches can be prevented upon the return stroke.

What is claimed is:

1. An automatic adjusting device for vehicle brakes comprising a brake lever movable to effect rotation of a brake actuating shaft, said brake lever having a housing portion, adjusting means located in said housing portion for adjusting the position of the brake actuating shaft in response to brake wear, said adjusting means comprising a worm wheel mounted on the brake actuating shaft for joint rotation therewith and a worm for rotating said worm wheel in response to movement of the brake actuating shaft in excess of a predetermined amount, clutch means actuatable to provide for rotation of said worm in response to movement of said brake actuating shaft in excess of said predetermined amount to thereby effect rotation of said worm wheel, a drive member for actuating said clutch means in response to movement of the brake actuating shaft in excess of said predetermined amount, said drive member being movable upon movement of said brake lever and having a predetermined stroke upon completion of which said clutch is actuated, and stop means for limiting the stroke of said brake lever to said predetermined stroke of said drive member to prevent breaking thereof, said stop means comprising a stationary lever fixed to a stationary part of the motor vehicle and having a portion projecting into said housing portion of said brake lever, said portion of said stationary lever having a cam stop thereon and said housing portion being provided with a recess which said cam stop engages, the dimensions of said cam stop and recess defining the maximum stroke of said brake lever.

2. An automatic adjusting device according to claim 1 wherein said cam stop is formed on a ring arranged adjacent the inner wall of the housing and connected with said stationary lever through a sleeve.

* * * * *